July 10, 1934.　　　J. E. CLYDE　　　1,966,165
AUTOMOBILE PARKING GARAGE
Filed May 19, 1932　　3 Sheets-Sheet 1
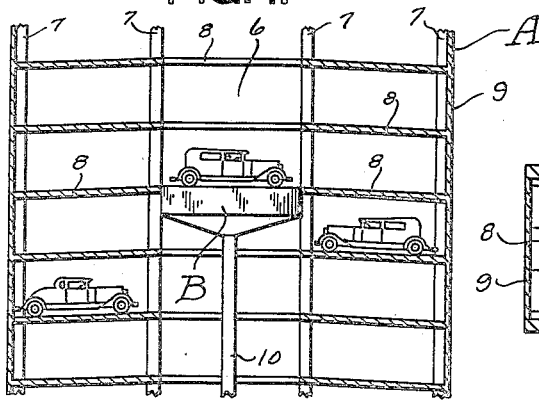
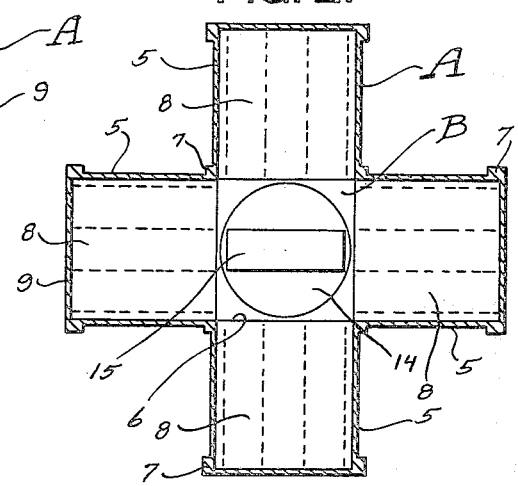
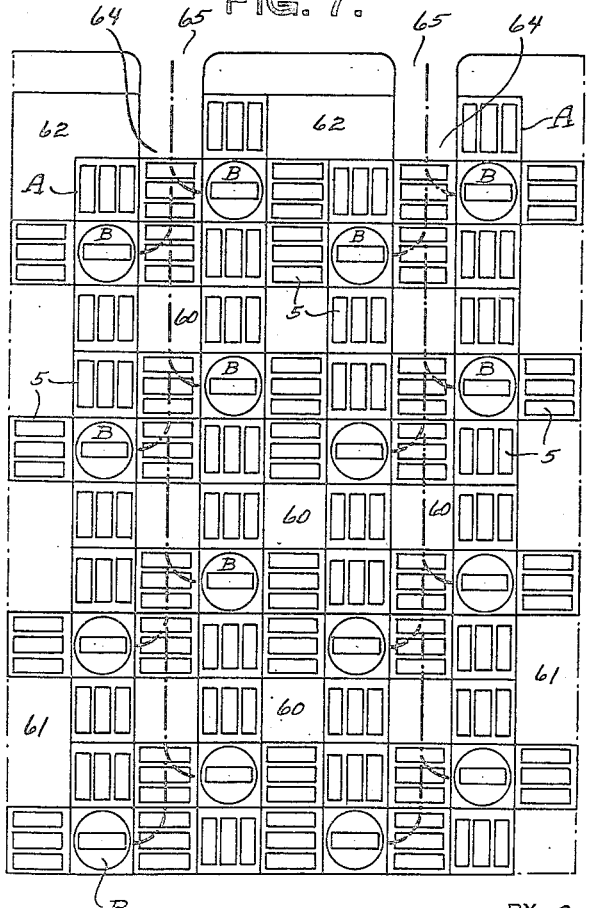
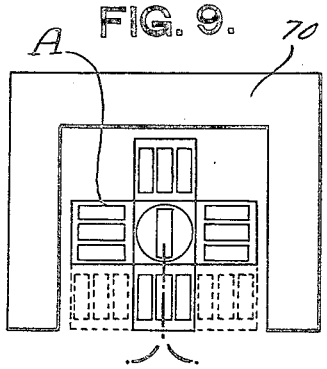
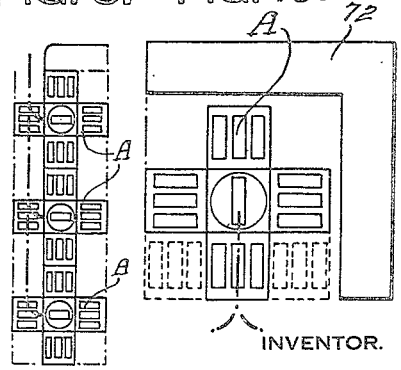
INVENTOR.
James E. Clyde
BY Lancaster, Allwine and Rommel
ATTORNEYS.

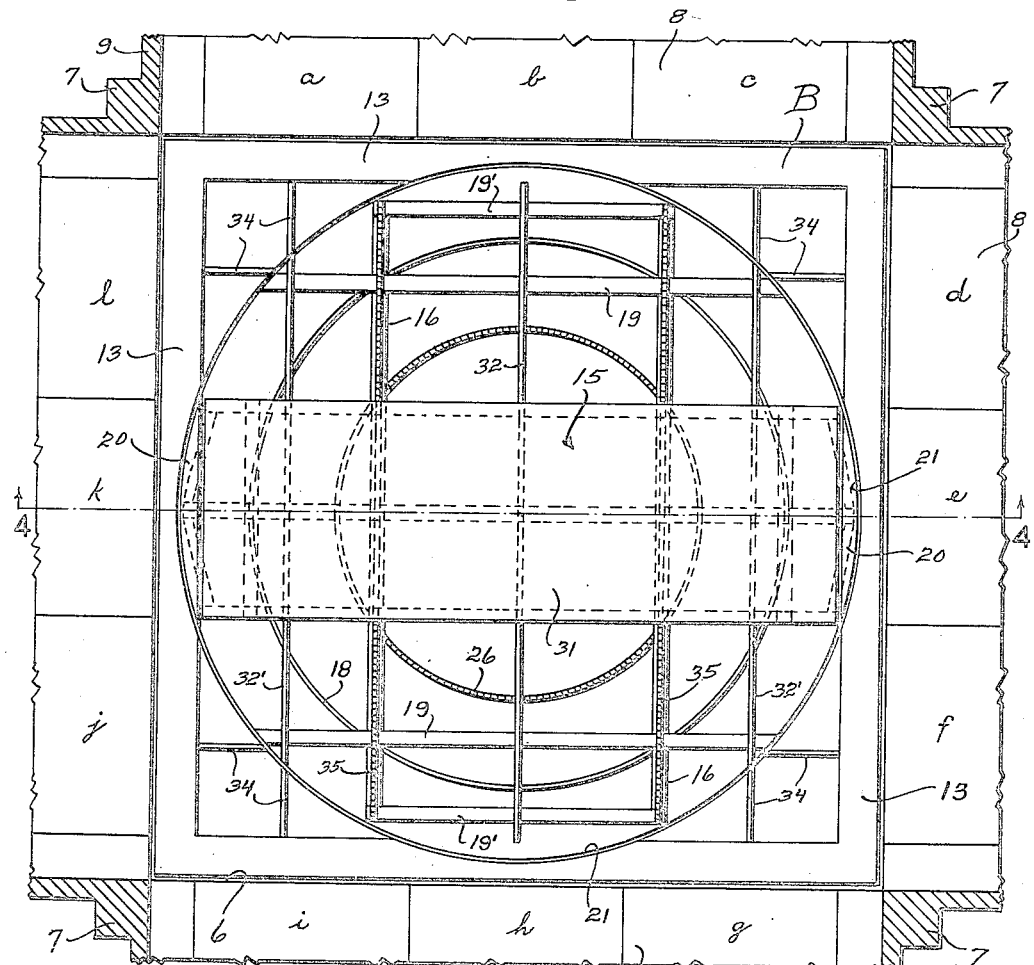
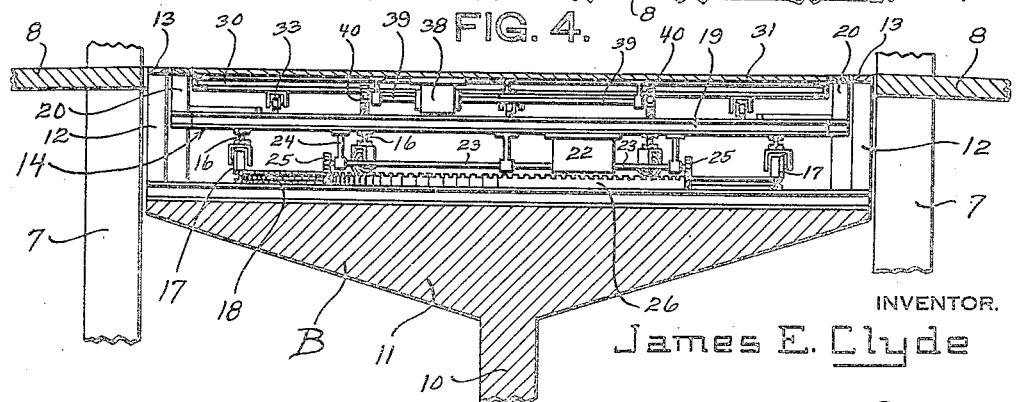

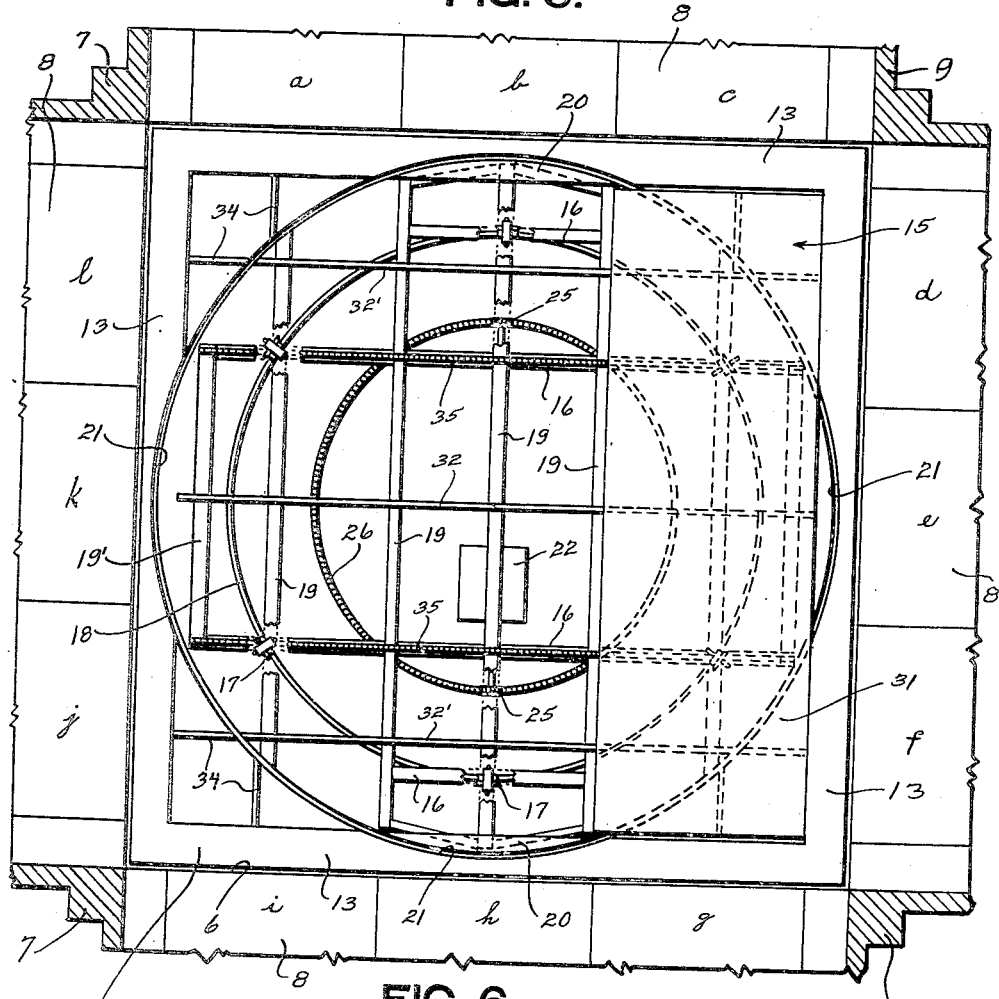
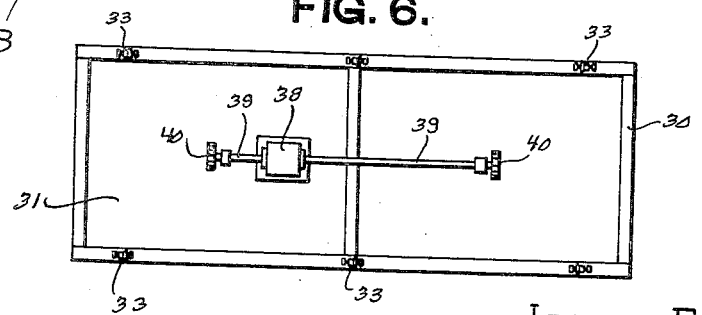

Patented July 10, 1934

1,966,165

UNITED STATES PATENT OFFICE 1,966,165

AUTOMOBILE PARKING GARAGE

James E. Clyde, Syracuse, N. Y.

Application May 19, 1932, Serial No. 612,359

6 Claims. (Cl. 214—16.1)

The present invention relates to storage buildings and the primary object of the invention is to provide an automobile parking garage embodying an arrangement whereby a maximum number of cars may be stored in a given area and without requiring skillful maneuvering of the cars for close storage thereof.

A further object of the invention is to provide a building structure for the storage of automobiles and the like wherein the cars may be quickly and easily placed and removed without requiring the moving of other cars.

A further object of the invention is to provide a storage building having superposed storage floors provided with storage areas served by a lift of novel construction permitting placing and removal of cars from any stall of either of the storage areas.

A further object of the invention is to provide a multiple floor garage embodying a system of parking units served by centrally located elevators provided with a revoluble and laterally movable platform having a floor area of such dimension with respect to the dimension of the elevator as to permit parking of cars in any desired or vacant stall in the entire storage area with which the elevator is associated.

A still further object of the invention is to provide a vehicle parking system embodying a storage section including an elevator area and storage areas radiating from the elevator area, said storage areas to receive a number of vehicles in side by side relation and the elevator area having an elevator of novel construction permitting selected placing of the vehicles.

Other objects and advantages of the present invention will be apparent during the course of the following detailed description, taken in connection with the accompanying drawings, forming a part of this specification and in which drawings—

Figure 1 is a fragmentary vertical section thru the improved storage building.

Figure 2 is a horizontal section of one of the storage units.

Figure 3 is an enlarged horizontal sectional view at the center or elevator section of the unit, and showing the elevator in top plan.

Figure 4 is a vertical section on the line 4—4 of Figure 3.

Figure 5 is a view partly in top plan and partly broken away of the elevator and showing the platform rotated and laterally shifted from the position shown in Figure 3.

Figure 6 is a bottom plan view of the movable platform for the elevator.

Figure 7 is a diagrammatic plan view showing the arrangement of grouping a plurality of the storage units as upon a large building lot.

Figure 8 is a diagrammatic view showing the arrangement of storage units when placed upon a long narrow building lot.

Figure 9 is a diagrammatic view showing one of the storage units when arranged at the rear of a U-shaped building.

Figure 10 is a diagrammatic view showing one of the storage units arranged at the rear of an L-shaped building.

Referring to the drawings in detail, and wherein similar reference characters designate corresponding parts thruout the several views, and referring particularly to Figures 1 to 6 inclusive, the storage building unit A is in plan, in the form of a cross providing storage sections 5 radiating from an elevator opening or section 6 having an area substantially equal to each of the storage sections 5. The building A is formed of a series of superposed floors of the configuration shown in Figure 2 each served by an elevator B vertically movable in the shaft forming opening 6.

The building may be of any desired construction such as of reinforced concrete having the columns 7 supporting the superposed storage floors 8 enclosed at their outer sides by the building wall 9. The storage floors 8 of each storage section 5 preferably slope downwardly from the shaft opening 6 and are preferably of a width to receive three vehicles in side by side relation as indicated by the dotted line showings in Figure 2. At the ground or first floor of the storage unit, any one of the radially arranged storage sections 5 may serve as an entrance and exit way whereby vehicles may pass to and from the elevator B arranged at the center or hub of the building. As will be observed in Figure 3, each floor unit provides storage for twelve vehicles arranged three at each side of the elevator shaft 6.

Referring now to the construction of the elevator B, the same is adapted for vertical movement in the shaft opening 6 and embodies an arrangement whereby a car may be stored or removed from any stall in the entire building without requiring the moving of other cars or maneuvering of the car being stored or removed in order to properly align the car with the desired stall.

While in the example shown the elevator B is of the hydraulic type vertically movable by the plunger 10, the elevator may be of the cable type if so desired. The elevator B comprises the base structure 11 which is square shaped in plan and of a dimension to approximately fill the shaft opening 6. Supported about the margin of the base structure 11 are framing walls 12 which at their upper edges provide narrow tread surfaces 13 adapted to be aligned with the surfaces of the floors 8. Arranged within the square framing formed by the walls 12, is a turntable 14 which in turn supports a laterally movable platform 15 operable independently of the turntable 14.

The turntable 14 comprises a suitable framing embodying supporting I beams 16 which in the example shown are four in number and arranged in parallel relation with the two outermost supporting beams being of less length than that of the inner beams as shown in Figure 5. Secured to the under sides of the supporting rails or beams 16 is a series of supporting rollers 17 adapted for travel upon a circular track 18 arranged axially of the framing walls 12 and suitably supported upon the base structure 11. Supported transversely upon the beams 16 are cross beams 19. Supported at each end of the two inner cross beams 19 is a segmental-shaped tread member 20 having its upper tread surfaces aligning with the tread surfaces 13 of the framing walls 12. These segmental-shaped tread members 20 are adapted to fit into segmental-shaped recesses 21 formed in the inner side of each wall 12 at a point midway the ends thereof and on an axis forming the axis of the circular track 18. The semi-circular-shaped tread members 20 when fully interfitting in either pair of the recesses 21, have their straight sides aligning with the inner edges of the tread surfaces 13.

A rotating means is provided for revolving the turntable 14 and this means preferably comprises an electric motor 22 supported from the beams 19 and connected to shafts 23 journaled in brackets 24. Fixed to the outer end of each shaft 23 is a driving gear wheel 25 and these gear wheels mesh with a circular toothed rack 26 arranged concentrically of the circular track 18. The sections of the shaft 23 at opposite sides of the motor 22 are of course rotated in opposite directions.

The platform 15 is intended to be wholly supported upon the turntable 14 and comprises a rectangular-shaped supporting frame 30 having mounted thereon a floor 31 of rectangular shape and of a length slightly less than the distance between the framing walls 12. Supported in parallel relation upon the cross beams 19 are suitable track rails 32 and 32' for travel of suitable wheels 33 carried by and forming supports for the platform frame 30. The track wheels 33 are rotatable on axes parallel to the longitudinal axis of the platform whereby the platform may be shifted laterally toward and from the framing walls 12. The outer track rails 32' have their ends terminating on the arc of the segmental-shaped tread members 20 and are adapted to selectively align with track rail sections 34 carried by the elevator base structure 11 and fixed with respect to the framing walls 12. The track rail sections 34 are arranged in right angular relation at each corner portion of the elevator framing and form continuations of the track rails 32' when aligned therewith to form supports for the track wheels 33 when the platform is moved laterally into engagement with one of the framing walls 12, as shown in Figure 5. Supported upon the cross beams 19 in parallel relation between the track rails 32 and 32', and preferably directly above the inner supporting beams 16, are toothed racks 35 which may be supported at their ends upon short cross beams 19' supported upon the ends of the inner beams 16. These cross beams 19' also form supports for the terminal portions of the center track rail 32. A propelling means is provided for imparting movement to the platform 15 and preferably embodies an electric motor 38 rotating axially aligning shafts 39, the shafts being provided at their ends with gears 40 which mesh with the racks 35. The motor 38 may be suitably secured to the under side of the platform floor 31 so as to clear the cross beams 19 during lateral travel of the platform.

Any suitable form of control may be provided for controlling the electric motor 22 for causing rotation of the turntable 14, and controlling the electric motor 38 for shifting the platform 15. The control for the elevator may be of any conventional type.

From Figures 3 and 5 it will be noted that the platform 15 is of a width equal to one-third the distance between the framing walls 12 and it is essential that the platform be of a width no greater than one-third the distance between the framing walls 12 to permit movement of the platform to three separate positions upon the turntable 14 to properly align with the individual stalls of the storage sections 5. It will also be noted from Figures 3 and 5 that the segmental tread members 20 must be interfitting in the recesses 21 to permit lateral shifting of the platform 15 and this insures proper alignment of the platform with the stalls of the storage floors. In Figure 4 it will be noted that the platform is so mounted upon the base structure of the elevator as to have the floor 31 align with the tread surfaces 13.

In the operation of the parking system for storing a vehicle in any desired stall, upon any desired floor, in Figures 3 and 5 the twelve stalls of the storage unit have been lettered from "a" to "l" inclusive in a clockwise direction about the elevator shaft 6. The showings in Figures 3 and 5 represent portions of one of the upper storage floors and when it is desired to store a vehicle in the stall "c" on the fifth floor of the storage building, the vehicle is driven upon the platform 15 at the ground or first floor. The platform 15 is preferably in a central position as in Figure 3 for disposing the load centrally of the elevator. The elevator is then raised to the level of the fifth floor and during which time the platform 15 may be rotated thru 90° by the turntable 14 operated by the motor 22. After the platform 15 has been rotated to align between the stalls "b" and "h", the motor 38 is operated for shifting the platform laterally upon the track rails so as to align between the stalls "c" and "g" as shown in Figure 5. The vehicle may then be driven off of the platform 15, straight into the stall "c". To remove a car from storage in the stall "b", the operation would be reversed, the platform 15 preferably being moved to a central position upon the elevator during raising and lowering thereof to prevent eccentric loads upon the elevator during travel.

An advantage of prime importance in the parking system is the fact that a vehicle may be parked in any desired or vacant stall in any desired storage section. This is made possible by the provision of a rotatable and laterally movable platform, the platform having a width no greater than one-third the width of the elevator platform. With the arrangement shown it will be seen that a vehicle may be placed or removed from either of the stalls "a" to "l" inclusive, and that the operator need not know in advance of storing a vehicle, just which stalls are vacant.

Referring particularly to Figure 7 showing the layout of a plurality of the building units when placed upon a relatively large lot capable of having four of the units arranged transversely of the lot, it will be noted that the units have interfitting relation transversely of the lot and abutting relation longitudinally of the lot. That is, the storage sections 5 in one direction of the building lot interfits in the corners formed by the storage sections of the adjacent unit, while in a direction at right angles thereto the ends of the storage sections 5 abut one another to provide open air spaces of shafts 60 inwardly of the outer walls of the group of units and open spaces 61 about the margin of the structure. The dot and dash lines in Figure 7 represent the margins of the building lot. It will here be noted that with this arrangement, an open side is provided for each of the storage sections for light and ventilation. The spaces 62 at the front of the storage building may provide office and store space for the first floor of the building. It will also be noted in Figure 7 that the building units "A" are arranged with the elevator shafts arranged in straight rows from the front to the rear of the building and this provides, on the first or ground floor of the building, drive ways 64 extending thruout the depth of the building between the parallel rows of elevators. The drive ways 64 have the entrance and exit ways 65 so that the drive ways 64 may serve two rows of the building units. The heavy dot and dash lines along the drive ways 64 illustrate the manner in which vehicles may be driven upon the elevators.

Referring to Figure 8, an arrangement is shown whereby three of the storage units may be placed in a row along a long narrow building lot with a drive way provided along one side of the row of building units.

Figure 9 shows an arrangement whereby one of the storage building units may be arranged at the rear of a U-shaped building designated by the numeral 70.

Figure 10 shows an arrangement wherein one of the storage building units is arranged at the rear of a corner or L-shaped building 72. In each of the showings in Figures 9 and 10, one of the receiving storage sections 5 upon the first or ground floor serves as an entrance drive way to the centrally located elevator.

Thus it will be seen that an improved building structure for the storing of motor vehicles and the like has been provided wherein the vehicles may be placed in close storage in any selected space and upon any floor of the building and without requiring moving of other vehicles or skillful maneuvering of the vehicle being stored. The specific formation of the building unit and the construction of the elevator will permit storing of a vehicle in any desired or vacant stall in the entire building unit by the provision of the rotatable and laterally shiftable platform which is of a width no greater than one-third the width of the elevator platform upon which it is mounted. It will also be noted that when a series of the building units "a" are grouped in a manner as in Figure 7, ample drive ways are provided permitting ready access to any of the elevators.

Changes in the shape, size and arrangement of parts may be made to the form of invention herein shown and described, without departing from the spirit of the invention or the scope of the following claims.

I claim:

1. In a vehicle storage building, a storage unit having a square hollow hub section and storage stalls opening at one end into each side of the hub section, a square elevator framing vertically movable in the hollow hub section and having upstanding side walls forming tread surfaces, a turntable rotatable within the framing below the tread surfaces, and a platform laterally movable on the turntable with its upper surface aligning with said tread surfaces and having a width equal to the width of one of the storage stalls.

2. In a vehicle storage building, a storage unit having a square hollow hub section and storage stalls opening at one end into each side of the hub section, a square elevator framing vertically movable in the hollow hub section embodying upstanding marginal walls, a turntable rotatable in the framing, and a rectangular shaped platform laterally movable upon the turntable between the upstanding walls to positions beyond each side of the platform when positioned axially of the turntable.

3. In a vehicle storage building embodying a hub section and storage sections radiating from the hub section, an elevator in the hub section embodying a base structure having upstanding marginal framing walls providing tread surfaces at their upper edges, a turntable rotatable in the framing and supported by the base structure, said turntable having segmental-shaped tread sections for interfitting in segmental-shaped recesses provided in the framing walls, and a platform laterally movable on the turntable between the framing walls and rotatable with the turntable when aligned between the segmental-shaped tread portions.

4. In a vehicle storage building embodying a hub section and storage floors radiating from the hub section, said storage floors each providing a plurality of storage floors, an elevator movable in the hub section embodying a base structure and a marginal framing embodying upstanding framing walls, a turntable mounted upon the base structure having diametrically disposed segmental-shaped tread portions interfitting in segmental-shaped recesses provided in the framing walls, means for rotating the turntable, a platform laterally movable on the turntable and having a width no greater than the straight sides of the segmental-shaped tread portions, and means for imparting movement to the platform independently of the turntable.

5. In a vehicle storage building embodying a hub section and storage floors radiating from the hub section, an elevator in the hub section embodying a base structure, upstanding framing walls about the margins of the base structure, a turntable rotatable on the base structure inwardly of the framing walls, parallel front rails on the turntable, track rail sections supported on the base structure to align with the track rails on the turntable when in parallel relation to the framing walls, and a platform supported on the turntable by rollers movable on the track rails and the track rail sections when aligning therewith, said platform being laterally movable into engagement with the framing walls.

6. In a vehicle storage building, a plurality of storage units each embodying an open hub section and multi-floored storage sections radiating from the hub section, and an elevator in each hub section embodying a revoluble and laterally movable platform, said units being arranged with the hub sections in straight lines along one direction of the building providing drive ways between adjacent rows of hub sections and a row of air shafts between each row of hub sections.

JAMES E. CLYDE.